US012624809B2

(12) United States Patent
Bukkems et al.

(10) Patent No.: US 12,624,809 B2
(45) Date of Patent: May 12, 2026

(54) LUMINAIRE FOR ILLUMINATING A SURFACE

(71) Applicant: SIGNIFY HOLDING B.V., Eindhoven (NL)

(72) Inventors: Peter Johannes Martinus Bukkems, Deurne (NL); Erik Paul Boonekamp, Bunnik (NL); Marcus Cornelis Van Meel, Helmond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/108,771

(22) PCT Filed: Aug. 22, 2023

(86) PCT No.: PCT/EP2023/073036

§ 371 (c)(1),
(2) Date: Mar. 5, 2025

(87) PCT Pub. No.: WO2024/052119

PCT Pub. Date: Mar. 14, 2024

(65) Prior Publication Data

US 2026/0078881 A1 Mar. 19, 2026

(30) Foreign Application Priority Data

Sep. 6, 2022 (EP) .................................... 22194142

(51) Int. Cl.
*F21S 4/28* (2016.01)

(52) U.S. Cl.
CPC ...................................... *F21S 4/28* (2016.01)

(58) Field of Classification Search
CPC ........................................................ F21S 4/28
See application file for complete search history.

(56) References Cited

U.S. PATENT DOCUMENTS

| | | | | |
|---|---|---|---|---|
| 2001/0022723 | A1 | 9/2001 | Siminovitch et al. | |
| 2011/0141724 | A1* | 6/2011 | Erion | F21V 23/009 362/230 |
| 2015/0345743 | A1* | 12/2015 | Trincia | F21V 5/048 362/217.05 |
| 2020/0088927 | A1* | 3/2020 | Denissen | G02B 6/0068 |
| 2022/0243875 | A1* | 8/2022 | Boonekamp | G02B 27/0994 |
| 2025/0146633 | A1* | 5/2025 | Van Meel | F21S 4/28 |
| 2025/0180186 | A1* | 6/2025 | Spiro | F21V 5/08 |

FOREIGN PATENT DOCUMENTS

| | | | |
|---|---|---|---|
| CN | 210319717 | U | 4/2020 |
| CN | 214536037 | U | 10/2021 |
| DE | 202010008480 | U1 | 12/2011 |
| DE | 102021104743 | A1 | 9/2022 |
| EP | 3726125 | A1 | 10/2020 |

* cited by examiner

*Primary Examiner* — Christopher E Dunay

(57) ABSTRACT

A luminaire that produces two beams of light. First of light is generated and output, as a first light beam, from a first chamber of the luminaire. Second light is generated and output from a second chamber into a third chamber via an elongate component that performs beamshaping on the second light. The beamshaped second light is output from the third chamber as a second beam of light. An elongate component holder holds or supports the elongate component and provides at least part of the bounds for the first and second chambers.

14 Claims, 3 Drawing Sheets

LUMINAIRE FOR ILLUMINATING A SURFACE

CROSS-REFERENCE TO PRIOR APPLICATIONS

This application is the U.S. National Phase application under 35 U.S.C. § 371 of International Application No. PCT/EP2023/073036, filed on Aug. 22, 2023, which claims the benefit of European Patent Application No. 22194142.0, filed on Sep. 6, 2022. These applications are hereby incorporated by reference herein.

FIELD OF THE INVENTION

The present invention relates to the field of lighting, and in particular, to luminaires for illuminating a wall with two light beams.

BACKGROUND OF THE INVENTION

There is an increasing interest in accent lighting. One area of growing interest is the illumination of surfaces, which is commonly provided by luminaires that project light onto a surface to provide a wall wash effect. Wall-wash lighting has a perceived effect of improved sense of space, and provides texture and interest to an illuminated surface. Typically, luminaires capable of providing a pattern of light comprise a light source that emits or projects light in a direction of the surface. For instance, currently available luminaires include directional downlights or spotlights positioned to illuminate a wall or surface.

One area of particular interest is to provide a two-tone effect on an illuminated surface. In this scenario, the surface or wall is illuminated with two light separate beams that appear to be stacked on top of one another, forming an upper illuminated area having first light characteristics and a lower illuminated area having second, different light characteristics. The upper and lower illuminated areas may differ in color, color temperature and/or intensity.

SUMMARY OF THE INVENTION

The invention is defined by the claims.

According to examples in accordance with an aspect of the invention, there is provided a luminaire for illuminating a surface with two beams of light.

The luminaire comprises: a first chamber housing a first lighting arrangement for generating first light having first light characteristics, the first chamber comprising a first light output window for outputting the first light from the first chamber out of the luminaire in the form of a first light beam; a second chamber housing a second lighting arrangement for generating second light having second, different light characteristics; an elongate optical component configured to perform beamshaping on light provided to the elongate optical component: an elongate component holder configured to hold the elongate optical component and forming at least part of the bounds of the first chamber and at least part of the bounds of the second chamber.

The elongate component holder is configured to: prevent or restrict the passage of no less than 90% of the first light from the first chamber to the elongate optical component; and permit the passage of the second light from the second chamber to the elongate optical component; and a third chamber, at least partially bounded by the elongate optical component and configured to receive beamshaped second light from the elongate optical component, the third chamber comprising a second light output window for outputting the beamshaped second light from the third chamber out of the luminaire in the form of a second light beam.

The present disclosure provides a luminaire for illuminating a surface or a wall with two beams of light. A first light beam is output from a first chamber. A second light beam is passed from a second chamber to an elongate optical component that performs one or more beam shaping processes on the received light. The beamshaped light is passed through to a third chamber, from which a second light beam is output.

The present disclosure proposes to use an elongate component holder as part of the boundary between the first and second chambers, as well as to hold the elongate optical component. This provides an approach for reducing a size of the luminaire. This effect is achieved by providing an element that is able to perform more than one function at a same time.

In some examples, a cross-sectional shape of the elongate optical component comprises an arc; and the elongate component holder comprises a holding portion, having an arc-shaped cross-sectional area, for holding the elongate optical component at the arc of the cross-sectional shape of the elongate component holder. This approach provides a compact structure for the elongate component and elongate component holder.

The elongate component holder may comprise a translucent or transparent portion that defines at least part of the bounds of the second chamber and is configured to permit the passage of light from the second chamber to the elongate optical component.

Preferably, the translucent or transparent portion of the elongate component holder is configured to diffuse light passing from the second chamber to the elongate optical component. This increases the uniformity of light passing to the elongate optical component.

The luminaire may further comprise an optical foil, for performing diffusing of light along a longitudinal axis of the elongate optical element. The optical foil may be held between the elongate optical component and the elongate component holder. The use of optical foil (e.g., rather than creating or etching a diffuser) reduces the material cost and complexity of manufacturing the luminaire. Positioning the optical foil at this location allows for easy installation of the optical foil (therefore providing a diffusing functionality), without the need for any additional clamping or holding components such as glue or the like. This therefore provides a more compact and cost-effective luminaire.

In some examples, the elongate component holder comprises a reflective portion that defines at least part of the bounds of the first chamber and is configured to reflect first light incident thereon. This retains first light within the first light chamber (e.g., rather than said light being absorbed by the elongate component holder), improving the energy efficiency of the luminaire.

The elongate component holder may comprise a scattering portion that defines at least part of the bounds of the first chamber and is configured to scatter and/or diffuse first light in the first chamber. This approach increases the uniformity of the first light within the first chamber, making the first light beam have a more uniform intensity distribution and reducing glare.

The elongate component holder may be configured to prevent the passage of light from the elongate optical component to the first chamber. This reduces mixing of the second light with the first light, making the two light beams more distinguishable from one another.

In some examples, the first light output window and the second light output window are configured to define a distinguishable boundary between the first light beam and the second light beam. This approach can be used to simulate a natural horizon using the two light beams.

The second light output window may be configured to define a distinguishable bottom edge to the second light beam. This reduces a likelihood of the second light beam illuminating an undesired surface, e.g., the floor, which would distract from the illumination of the intended surface.

The luminaire may comprise a ceiling mount configured for mounting the luminaire to a ceiling.

Preferably, the luminaire is configured such that when luminaire is mounted to the ceiling via the ceiling mount, the first light beam output by the luminaire is above the second light beam output by the luminaire.

The first lighting arrangement may comprises a first set of one or more LEDs. Similarly, the second arrangement may comprise a second (e.g., different) set of one or more LEDs.

Preferably, the first light has a different color and/or color temperature to the second light.

In some embodiments, the elongate component holder is an extruded elongate component holder, being a component holder produced using an extrusion process. This means that a cost effective (materially and with respect to energy cost) mechanism can be used to produce the elongate component holder. Use of an extruded elongate component holder thereby provides a more cost effective luminaire.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
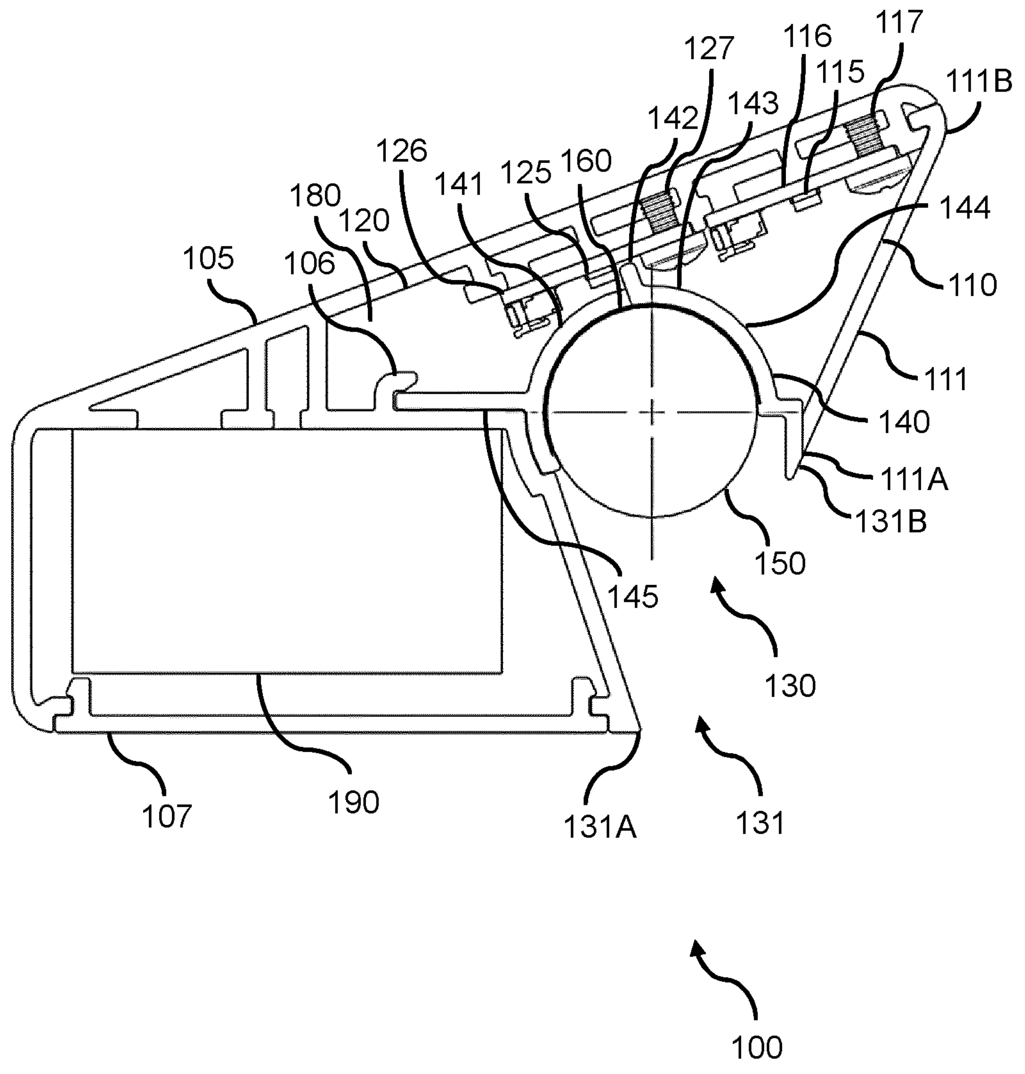
FIG. 1 provides a cross-sectional view of a luminaire.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Embodiments provide a luminaire that produces two beams of light. First of light is generated and output, as a first light beam, from a first chamber of the luminaire. Second light is generated and output from a second chamber into a third chamber via an elongate component that performs beamshaping on the second light. The beamshaped second light is output from the third chamber as a second beam of light. An elongate component holder holds or supports the elongate component and provides at least part of the bounds for the first and second chambers.

The present invention is based on the realization that a more compact luminaire can be achieved by using a same component to bound or delineate the chambers where light is emitted as to perform beamshaping on one of the beams.

Embodiments can be employed in any suitable environment in which it is desired to illuminate a surface with two beams of light, e.g., to provide ambient lighting in offices, homes or industrial environments.

In the context of the present disclosure, "beamshaping" refers to a process of modifying, changing or otherwise defining one or more characteristics of a shape or distribution of a beam of light (i.e., a beam shape or a beam distribution). For instance, beamshaping may comprise changing the outline of the shape of the beam of light. As another example, beamshaping may comprise changing the intensity distribution of the beam of light, e.g., modify the shape of the intensity distribution.

FIG. 1 illustrates a luminaire 100 according to an embodiment. The luminaire is configured for generating two beams of light.

The luminaire comprises at least three chambers, including a first chamber 110, a second chamber 120 and a third chamber 130.

A housing 105 may be used to at least partially define or lineate the chambers. The housing 105 may, for instance, be formed of any suitable material for a luminaire 100, such as a metal (e.g., aluminum/aluminium) or plastics.

The first chamber 110 houses a first lighting arrangement 115. The first lighting arrangement generates first light having first light characteristics. The first chamber 110 comprises a first light output window 111, configured to output the first light from the luminaire 100 (and therefore from the first chamber). The light output from the first light output window forms a first light beam.

The second chamber 120 houses a second lighting arrangement 125. The second lighting arrangement generates second light, having second light characteristics that differ from the first light characteristics.

Example light characteristics include a color of light, a color temperature of light, a pattern of light, an intensity of light, a temporal pattern of light and so on. Thus, the first light may differ from the second light at least by virtue of having one or more different values for any (e.g., a subset or all of) the aforementioned example light characteristics.

Preferably, the first and second lighting arrangement are configured to emit light of a different color and/or color temperature. By way of example only, the first lighting arrangement 115 may, for instance, output blue light and the second lighting arrangement 125 may output yellow light. However, other combinations of colors or color temperatures can be used to advantage, depending upon the implementation requirements. For instance, the first lighting arrangement 115 may output one of the following: blue light, purple light, violet light, red light and so on. The second lighting arrangement may output one of the following: yellow light, green light, orange light, white light and so on.

The first lighting arrangement 115 may, for instance, comprise a first set of one or more LEDs. Similarly, the second lighting arrangement 125 may comprise a second, different set of one or more LEDs.

In the illustrated examples, each lighting arrangement is formed on a separate circuit board 116, 126 which is coupled to the housing via one or more respective screws 117, 127 or other securing members. Each circuit board 116, 126 may carry circuitry components for driving and/or controlling the operation of the lighting arrangement.

It is not essential that the lighting arrangements be provided on separate circuit boards. Rather, the first and second lighting arrangements may be mounted on a same circuit board.

The luminaire 100 further comprises an elongate component holder 140 that holds or supports an elongate optical component 150. The elongate component holder forms at least part of the bounds/boundaries/edges of the first chamber 110 and at least part of the bounds/boundaries/edges of the second chamber 120. Put another way, the elongate component holder can define at least some of the delineation between the first and second chambers. Other bounds/edges of the first and second chamber may be defined by other components or parts of the luminaire.

The elongate optical component 150 is a component that performs beamshaping on received light. Thus, light that is received by the elongate optical component 150 undergoes a shaping process to produce a beam of light. The beamshaping may, for instance, create a gradient effect in the beam of light (e.g., an effect in which the intensity of the light changes with respect to a particular direction within the beam of light).

The elongate component holder 140 holds the elongate optical component 150 in a position such that the elongate optical component holds or defines at least part of the bounds, boundaries or edges of the third chamber 150. The elongate component holder 140 is located between the elongate optical component 150 and the first chamber 110, as well as being between the elongate optical component 150 and the second chamber 120.

The elongate component holder 140 is configured to restrict the passage of no less than 90%, e.g., no less than 95%, of the first light from the first chamber to the elongate component 150. In preferable examples, the elongate component holder completely prevents the passage of first light from the first chamber to the elongate optical component (discounting any stray or leakage light).

The elongate component holder 140 is further configured to permit the passage of second light from the second chamber 120 to the elongate optical component 150. For instance, as illustrated, the elongate component holder may comprise a translucent or transparent portion 141 that defines at least part of the bounds of the second chamber and is configured to permit the passage of light from the second chamber to the elongate optical component.

The portion 141 may be configured to diffuse light passing therethrough. This can be achieved by integrating diffusive particles into the portion 141.

The elongate component holder is preferably, as illustrated, configured to prevent or restrict the passage of no less than 90%, e.g., no less than 95%, the passage of light from the elongate optical component to the first chamber.

In preferred examples, the elongate component holder is configured to prevent or restrict the passage of no less than 90%, e.g., no less than 95%, of light between the first and second chambers. In the illustrated example, this is achieved via a protruding portion 142 of the elongate component holder that defines or delineates a boundary between the first and second chambers.

As previously explained, the elongate optical component 150 performs beamshaping on received light. Thus, second light that passes from the second chamber 120, through the elongate component holder 140 and to the elongate optical component undergoes beamshaping by the elongate component 150. The beamshaped light is then emitted into the third chamber 130.

The elongate optical component 150 may, for instance, be a cylindrical prism of optically transmissive material (such as plastics, glass or the like). In other words, the elongate optical components 150 may act analogously to a biconvex lens on received light. Such an elongate optical component would create/output a beam of light having a relatively wide beam angle in one direction (parallel to a length of the elongate optical component 150) and a relatively narrow beam angle in another direction (perpendicular to a length of the elongate optical component). This kind of beam has reduced emission of stray light (e.g., light emitting in undesirable directions), whilst facilitating the provision of getting light to the bottom of the third chamber 130.

The third chamber 130 comprises a second light output window 131 for outputting the beamshaped second light from the third chamber out of the luminaire in the form of a second light beam.

Thus, a first light beam is output from the first chamber 120 and a second light beam is output from the third chamber 130. The first light beam contains light originally generated by the first lighting arrangement 115 and the second light beam contains light originally generated by the second lighting arrangement 125. The second light beam is passed to the third chamber 130 via the elongate optical component (which performs beamshaping on said beam).

In this way, the second light beam is beamshaped by the elongate optical component. This allows, for instance, the second beam of light to be controlled to have a gradient (e.g., a particular intensity distribution).

The proposed approach provides a mechanism for providing two beams of light, one of which has been beamshaped, in a compact housing.

It will be appreciated that the first and second light beams may overlap in an overlap region. The size of the overlap region will be defined by at least the bounds of the first 111 and second 131 light exit windows, as well as the relative position of the first 115 and second 125 lighting arrangements in the first 110 and second 120 chambers. For instance, moving the second lighting arrangement 125 to be more distant from the elongate optical component would increase the overlap between the first and second light beams.

The elongate component holder may be an extruded elongate component holder. Thus, the elongate component holder may have been manufactured or produced using an extrusion process. This means that a cost effective (materially and with respect to energy cost) mechanism can be used to produce the elongate component holder. Use of an extruded elongate component holder thereby provides a more cost effective luminaire.

The elongate optical component may be formed of any suitable material for performing beamshaping on light (e.g., without significant absorption). Example materials include glass and PMMA. Preferably, the material is a material suitable for undergoing a protrusion manufacturing process, the benefits of which have been previously described.

Various optional features of the luminaire 100 are hereafter described. These optional features are illustrated in FIG. 1 for the sake of illustrative understanding.

The cross-sectional shape of the elongate optical component may comprise an arc. For instance, the elongate optical component may have a circular cross-sectional shape.

The elongate component holder 140 may comprise a holding portion 143, having an arc-shaped cross-sectional area, for holding the elongate optical component at the arc of the cross-sectional shape of the elongate component holder. The holding portion may, for instance, clamp or grip the elongate optical component 150.

The elongate component holder 140 may comprise a projection 145 configured to hold the elongate component holder to the housing 105. The housing may comprise a projection gripping portion for gripping the projection 145 of the elongate component holder 140, to thereby secure the holder 140 thereto.

The luminaire 100 may further comprise an optical foil 160. The optical foil is held between the elongate optical component 150 and the elongate component holder 140. The optical foil is configured to perform light diffusion on light passing from the second chamber 120 to the third chamber 130 (via the elongate optical component 150).

In particular, the optical foil is configured to perform light diffusion along a longitudinal direction of the elongate optical component, i.e. in directions that are parallel with the elongation of the elongate optical component.

Examples of suitable optical foils are well known in the art, and may be formed of any suitable material, such as Polytetrafluoroethylene (PTFE). Generally, the surface or structure of the optical foil comprises randomly or pseudo-randomly shaped and a periodically dispersed structures, that scatter received light in a pseudo-random pattern, thereby diffusing light transmitted therethrough.

The elongate component holder 140 may comprise a reflective portion 144. This defines at least part of the bounds of the first chamber 110 and is configured to reflect first light incident thereon. This decreases the amount of light that is absorbed by the walls or sides of the first chamber, increasing the amount of light in the first light beam output from the first chamber 110.

The reflective portion 144 may, for instance, be further configured to reflect second light incident thereon, e.g., retain light within the elongate optical component 150.

The reflective portion may, for instance, be formed of a reflective material. In some examples, the reflective portion is white, to improve the reflective properties of the reflective portion with low material cost.

In some examples, the elongate component holder comprises a scattering portion. The scattering portion also forms at least part of the bounds of the first chamber and is configured to scatter and/or diffuse first light in the first chamber. This increases the diffusion of light within the first chamber, making the first light beam have a more uniform intensity distribution.

This scattering portion may be provided instead of or in addition to the reflective portion previously described. For instance, the reflective portion 144 may be configured to both reflect and scatter/diffuse the first light in the first chamber.

In the illustrated example, the first light output window 111 comprises a sheet of translucent/transparent material. Suitable material examples are well known the skilled person, including plastics and glass. The first light output window may be held between the elongate component holder 140 and the housing 105.

In some examples, the first light output window 111 comprises or is a light diffuser, configured to diffuse the light output from the first light output window. This provides a light beam having a more uniform amplitude density.

It has previously been mentioned that various properties of the luminaire 100 define the shape of the first and second beams. This includes, for instance, the shape of the chambers 110, 120, 130, the position and structure of the light emitting arrangements 115, 125 and/or the shape of the light exit windows 111, 131.

In particular, the shape of the first chamber and/or the first light output window defines or controls the shape of the first light beam output from the first chamber.

The shape and/or position of a first edge 111A of the first light output window 111 defines a location of a first cut-off of the first light beam. A second edge 111B of the first light output window 111 defines a location of a second cut-off the first light beam.

In the illustrated example, the second light output window 131 comprises a gap or aperture in the third housing (i.e., is a space in the third housing). In this way, the shape of the third chamber (which defines the shape of the perimeter of the second light output window 131), as well as the beam-shaping performed by the elongate optical component 150, defines the shape of the second light beam.

In particular, a first edge 131A of the second light output window 131 (defined by the third chamber 130) defines a location of a first cut-off of the second beam. A second edge 131B of the second light output window 131 (also defined by the third chamber) defines a location of a second cut-off the second beam.

The edges of the first and second light output windows can effectively act as shielding elements, to define the edges or cut-off points of the light beam(s) output therethrough.

In this way, the spatial relationship between the first light beam and the second light beam can be controlled through appropriate configuration of the luminaire, particularly the edge(s) of the light output window(s).

To improve the uniformity of the second beam, the second chamber 120 may comprise a reflective zone 180. The reflective zone is configured to receive and redirect light emitted by the second lighting arrangement 125 that has not been directly transmitted through the elongate component holder 140 to the elongate component 150.

The luminaire 100 may further comprise additional circuitry 190. The additional circuit may comprise a power source and/or driver for driving and/or controlling the lighting arrangements 115, 125.

By way of example, the additional circuitry 190 may comprise a power supply. The power supply is configured to generate and/or provide power to the lighting arrangements. For example, the power supply may convert a power signal received from a mains supply to a driving signal for the lighting arrangement(s). In some examples, the power supply may comprise an energy storage unit, such as a battery, for reserve or auxiliary power.

Other suitable component parts for the additional circuitry (e.g., control logic and the like) are well known in the art, and would be readily apparent to the skilled person.

The housing 105 may comprise a detachable base element 107, which is detachable from the remainder of the housing. The detachable base element may be configured to allow access to the additional circuitry, e.g., for installation, maintenance and/or/repair.

In some examples, the first light exit window 111 is integrally formed with the elongate component holder 140. This increases an ease of manufacturing the luminaire 100.

Figure 2:
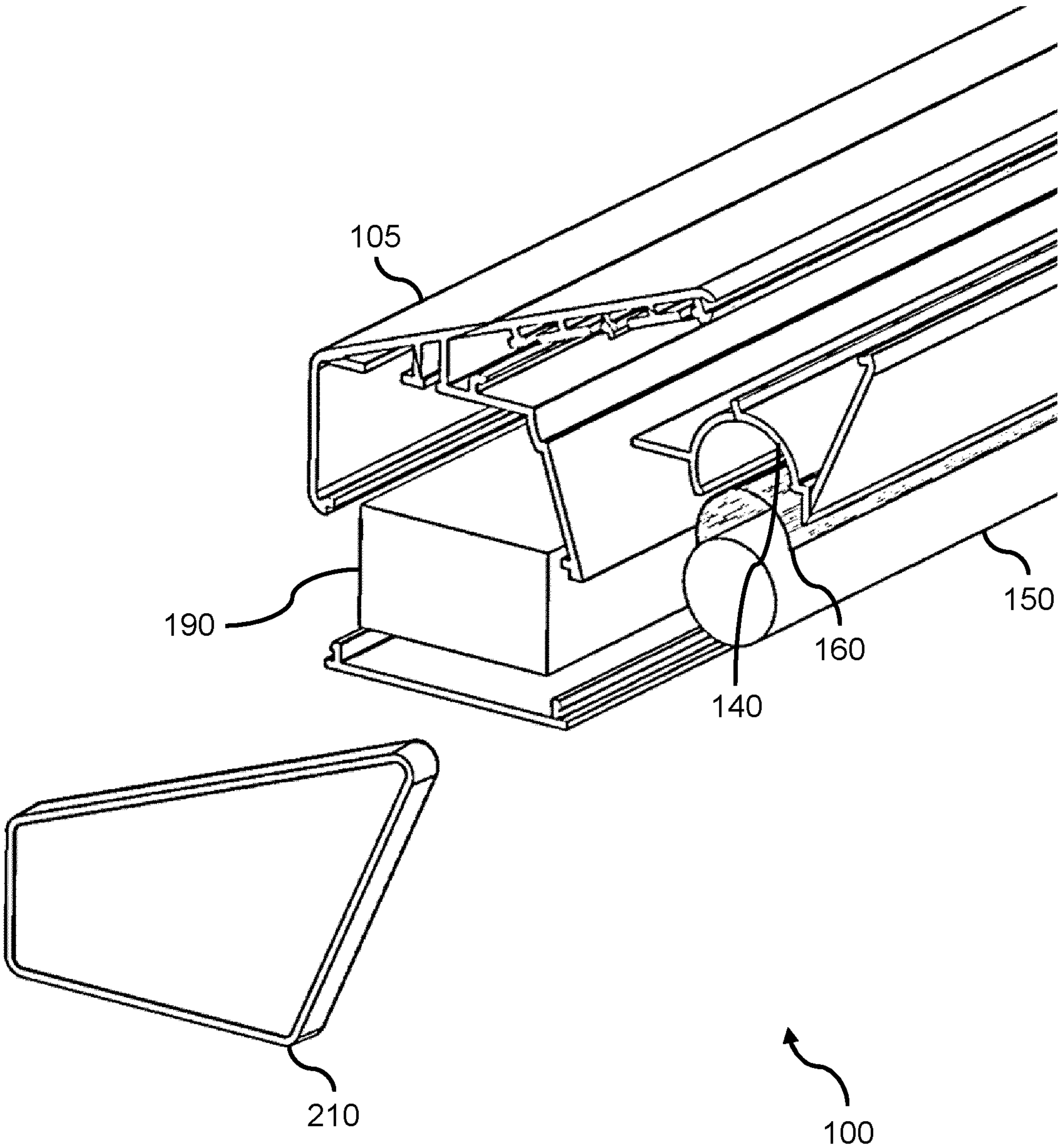
FIG. 2 provides an exploded view of a portion of a luminaire.

FIG. 2 provides an exploded view of the luminaire 100. The lighting arrangements have been omitted from this Figure for the sake of illustrative clarity. FIG. 2 more clearly illustrates the elongation of the elongate optical component and the corresponding elongate component holder.

FIG. 2 further illustrates another optional component of the luminaire 100, namely an end cap 210. The end cap may be fitted to the end of the luminaire, e.g., to prevent and/or restrict sliding or movement of the elongate optical component 150 and/or the elongate component holder 140.

Figure 3:
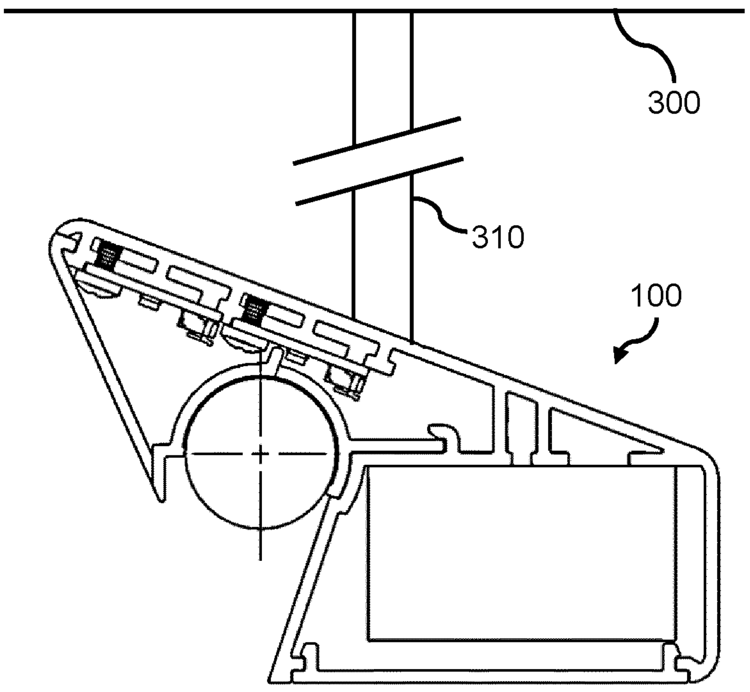
FIG. 3 provides a cross-section view of a luminaire installation.

FIG. 3 illustrates a luminaire installation 10 according to an embodiment, which comprises the luminaire 100 mounted to a ceiling 300.

FIG. 3 illustrates a further optional element of the luminaire, namely a ceiling mount 310 configured for mounting the luminaire 100 to the ceiling 300.

Figure 4:
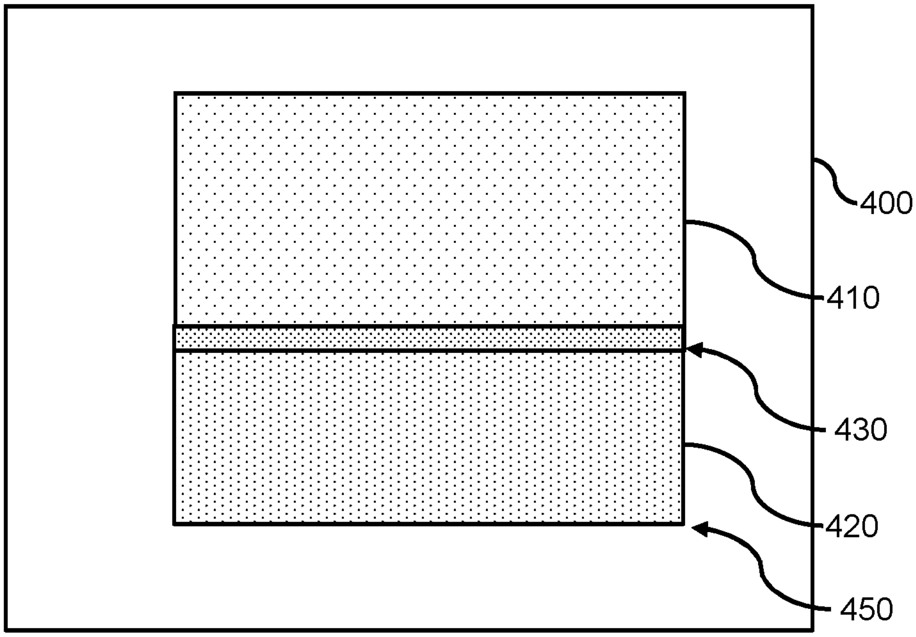
FIG. 4 illustrates a surface illuminated by a luminaire.

FIG. 4 illustrates the illumination of a surface 400 (e.g., a wall) by the first light beam and the second light beam. A first illumination area 410 represents a part of the surface illuminated by the first light beam, and a second illumination area 420 represents a part of the surface illuminated by the second light beam.

As illustrated, the luminaire may be configured such that, when the luminaire is mounted is mounted to the ceiling via the ceiling mount, the first light beam output by the luminaire is above the second light beam output by the luminaire. In this way, the first light output window may be above the second light output window (when the luminaire is mounted to the ceiling via the ceiling mount).

It will be appreciated that the size of each illuminated area will partly depend upon the distance and orientation of the luminaire with respect to the surface 400.

That being said, it has previously been explained how the spatial relationship between the first light beam and the second light beam can be controlled through appropriate configuration of the luminaire, particularly the edge(s) of the light output window(s). In particular, it is possible to control or define a spacing or overlap between the two light beams.

Preferably, the luminaire is configured such that there is a distinguishable overlap region 430, e.g., a boundary region or horizon between the first light beam and the second light beam. This simulates a natural horizon or boundary, for improved user experience. This approach has been identified as inducing a greater feeling of spaciousness and well-being in observers.

In particular, the overlap region can create a gradient effect between the two light beams, such that one light beam appears to merge into the other light beam. This can be achieved through appropriate configuration and selection of various components of the luminaire, including the bounds of the light exit windows (e.g., the edges 111A, 111B, 131A, 131B), the position of the light emitting arrangements 115, 125 and/or the structure/composition of the elongate optical element 150.

Thus, the luminaire is preferably configured such that at least part (e.g., no less than 1% or no less than 5% or no less than 10%) of each of the first 410 and second 420 illumination areas overlap the other of the first and second illumination areas. Preferably, no more than a predetermined percentage (e.g., no more than 20%, or no more than 10% or no more than 5%) of each of the first 410 and second 420 illumination areas overlap the other of the first and second illumination areas.

This approach allows different environmental conditions to be simulated using the luminaire, depending upon the color or other property of emitted light. For instance, if the first light beam comprises blue light and the second light beam comprises green light, a distance land horizon could be simulated.

Preferably, the luminaire is configured such that the second illumination area has a sharp cut-off or boundary 450 at its lowermost part. This can be achieved through appropriate configuration of the second light output window and/or appropriate positioning of the elongate optical component. In particular, the second light output window may be configured (e.g., appropriately shaped or spatially positioned) to define a distinguishable bottom edge to the second light beam.

In the context of the present disclosure, a subset of a larger set or plurality of items comprises one or more (but not all) of the larger set.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa.

Any reference signs in the claims should not be construed as limiting the scope.

The invention claimed is:

1. A luminaire for illuminating a surface with two beams of light, the luminaire comprising:
- a first chamber housing a first lighting arrangement for generating first light having first light characteristics, the first chamber comprising a first light output window for outputting the first light from the first chamber out of the luminaire in the form of a first light beam;
- a second chamber housing a second lighting arrangement for generating second light having second, different light characteristics;
- an elongate optical component configured to perform beamshaping on light provided to the elongate optical component;
- an elongate component holder configured to hold the elongate optical component and forming at least part of the bounds of the first chamber and at least part of the bounds of the second chamber, wherein the elongate component holder is configured to:
  - prevent or restrict the passage of no less than 90% of the first light from the first chamber to the elongate optical component; and
  - permit the passage of the second light from the second chamber to the elongate optical component; and
- a third chamber, at least partially bounded by the elongate optical component and configured to receive beam-shaped second light from the elongate optical component, the third chamber comprising a second light output window for outputting the beamshaped second light from the third chamber out of the luminaire in the form of a second light beam,
- wherein the elongate component holder comprises a translucent or transparent portion that defines at least part of the bounds of the second chamber and is configured to permit the passage of light from the second chamber to the elongate optical component.

2. The luminaire of claim 1, wherein:
- a cross-sectional shape of the elongate optical component comprises an arc; and
- the elongate component holder comprises a holding portion, having an arc-shaped cross-sectional area, for holding the elongate optical component at the arc of the cross-sectional shape of the elongate component holder.

3. The luminaire of claim 1, wherein the translucent or transparent portion of the elongate component holder is configured to diffuse light passing from the second chamber to the elongate optical component.

4. The luminaire of claim 1, further comprising an optical foil, for performing linear diffusing of light, held between the elongate optical component and the elongate component holder.

5. The luminaire of claim 1, wherein the elongate component holder comprises a reflective portion that defines at least part of the bounds of the first chamber and is configured to reflect first light incident thereon.

6. The luminaire of claim 1, wherein the elongate component holder comprises a scattering portion that defines at least part of the bounds of the first chamber and is configured to scatter and/or diffuse first light in the first chamber.

7. The luminaire of claim 1, wherein the elongate component holder is configured to prevent the passage of light from the elongate optical component to the first chamber.

8. The luminaire of claim 1, wherein the first light output window and the second light output window are configured to define a distinguishable boundary between the first light beam and the second light beam.

9. The luminaire of claim 1, wherein the second light output window is configured to define a distinguishable bottom edge to the second light beam.

10. The luminaire of claim 1, further comprising a ceiling mount configured for mounting the luminaire to a ceiling.

11. The luminaire of claim 10, wherein, when the luminaire is mounted to the ceiling via the ceiling mount, the first light beam output by the luminaire is above the second light beam output by the luminaire.

12. The luminaire of claim 1, wherein:

the first lighting arrangement comprises a first set of one or more LEDs; and the second lighting arrangement comprises a second set of one or more LEDs.

13. The luminaire of claim 1, wherein the first light has a different color and/or color temperature to the second light.

14. The luminaire of claim 1, wherein the elongate component holder is an extruded elongate component holder, being a component holder produced using an extrusion process.

* * * * *